United States Patent
Wagner

[11] Patent Number: 5,865,278
[45] Date of Patent: Feb. 2, 1999

[54] ROTATION DAMPER

[75] Inventor: Jörg Wagner, Kaiserslautern, Germany

[73] Assignee: TRW United-Carr GmbH & Co. KG, Germany

[21] Appl. No.: 823,988

[22] Filed: Mar. 25, 1997

[30] Foreign Application Priority Data

Mar. 25, 1996 [DE] Germany .................. 196 11 725.9

[51] Int. Cl.$^6$ .................. F16F 7/06; F16F 7/12
[52] U.S. Cl. .................. 188/130; 74/531; 74/574; 188/381; 188/83
[58] Field of Search .................. 188/130, 129, 188/83, 381; 267/201; 76/531, 574; 16/337–343

[56] References Cited

U.S. PATENT DOCUMENTS

| | | |
|---|---|---|
| 4,796,733 | 1/1989 | Nakayama . |
| 4,833,938 | 5/1989 | Reinwall et al. . |
| 4,840,083 | 6/1989 | Hagan et al. . |
| 4,869,125 | 9/1989 | Saigusa . |
| 4,981,322 | 1/1991 | Dowd et al. . |
| 5,257,680 | 11/1993 | Corcoran et al. ........ 188/381 |
| 5,460,248 | 10/1995 | Korb et al. . |
| 5,497,863 | 3/1996 | Schmidt et al. . |
| 5,605,208 | 2/1997 | Friedrichsen et al. ........ 188/130 |

FOREIGN PATENT DOCUMENTS

| | | |
|---|---|---|
| 06 16 920 A1 | 9/1994 | European Pat. Off. . |
| 07 79 447 A2 | 6/1997 | European Pat. Off. . |
| 29 06 288 B1 | 8/1980 | Germany . |
| 37 26 931 A1 | 2/1988 | Germany . |
| 38 29 209 A1 | 3/1990 | Germany . |
| 4323095 C1 | 7/1993 | Germany . |
| 9320677 U | 9/1993 | Germany . |
| 42 44 484 A1 | 7/1994 | Germany . |
| 93 20 677.1 | 10/1994 | Germany . |
| 5-149359 | 6/1993 | Japan . |
| 5-164169 | 6/1993 | Japan . |

Primary Examiner—Douglas C. Butler
Attorney, Agent, or Firm—Fay, Sharpe, Beall, Fagan, Minnich & McKee

[57] ABSTRACT

The invention relates to a rotation damper (1) including a plastic housing or storage part (2) carrying therein a rotor part (3). The rotor part (3) is joined to a rotatable shaft which extends through the housing. A damping device (4) is located between the storage part (2) and the rotor part (3). The damping device (4) surrounds the shaft and is made of damping plastic. The rotor part (3) and/or the damping device (4), respectively have at least one interengaging contact part which produces rotation resistance when the shaft is turning.

16 Claims, 2 Drawing Sheets

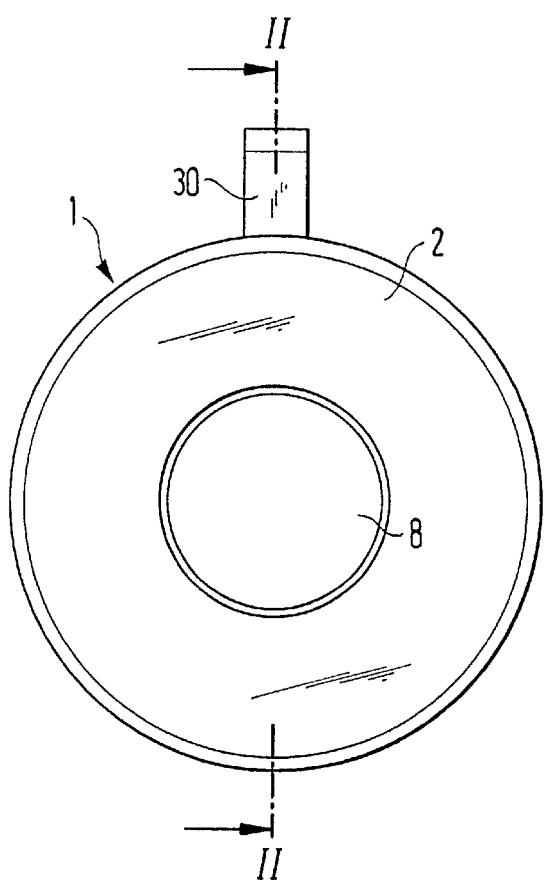
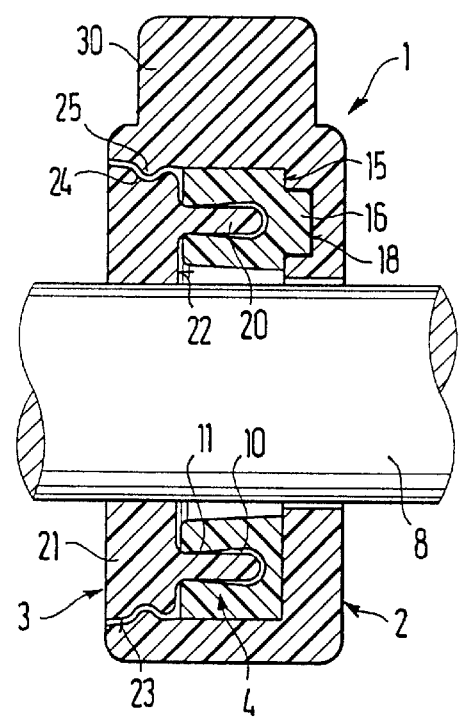

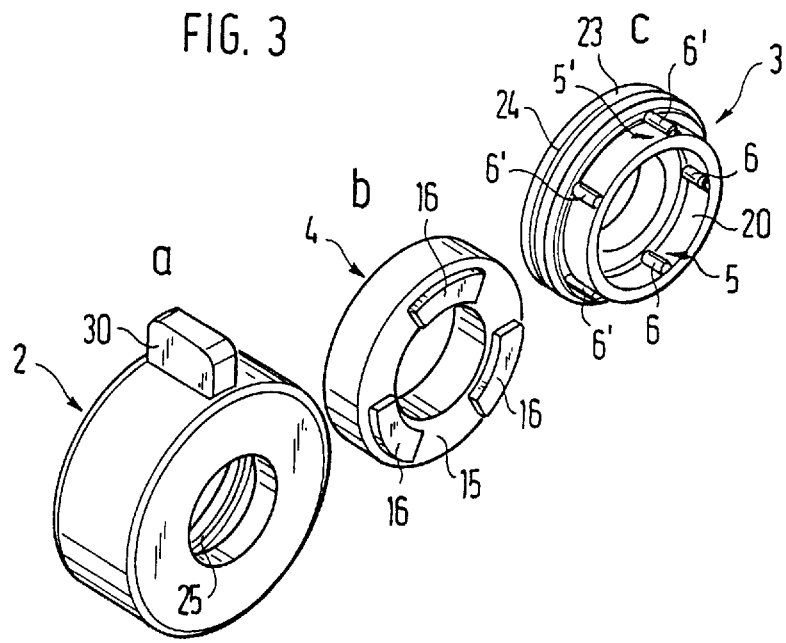
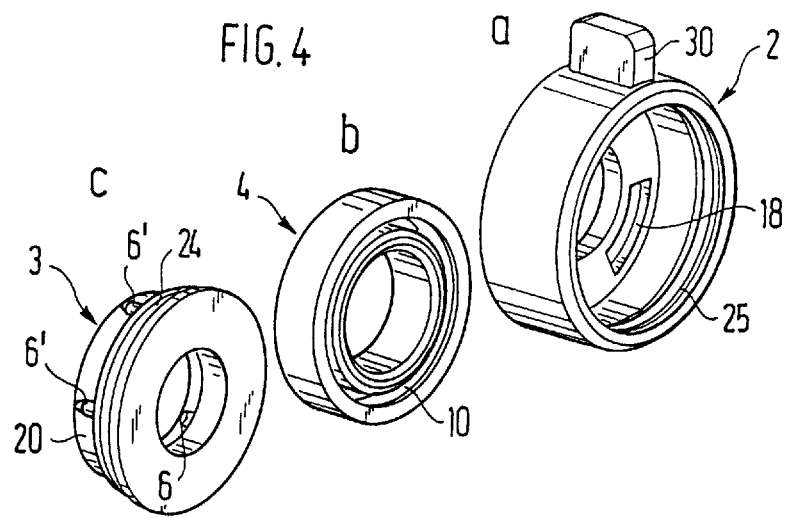

ROTATION DAMPER

BACKGROUND OF THE INVENTION

The invention relates to a rotation damper comprising a plastic housing carrying a rotor part, also made of plastic, that is joined to a rotatable shaft. A damping device is located between the housing and the rotor part.

A rotation damper is already known in the state of the art where the housing is fitted at its outer circumference with a gear wheel component, and the shaft of the rotor projects beyond a cover (German Patent No. 4315294 A1). The cover is locked behind a projection of the housing and is located between a sealing disk and a frontal surface of the rotor, facing the shaft. The frontal surface facing away from the rotor is equipped with a space in which a viscous medium is located. The space can be designed either in the form of a closed disk, or it can have an annular shape. Due to the small space for receiving the viscous medium, the damping effect is relatively low.

The state of the art also includes a rotation damper wherein a spiral spring is arranged between an interior delineation area of the cylindrical wall of a housing and an outer delineation area of a cylindrical rotor (German Patent No. 3821982 A1). This arrangement is a structurally expensive design since the rotor and the corresponding adjacent parts must control the spiral spring and there is also the need for the intermediary space for acceptance of the viscous medium.

By contrast, it is the object of the present invention to create a rotation damper which has good damping capability, avoiding the use of viscous medium, and having a less complicated construction.

SUMMARY OF THE INVENTION

This object is solved according to the invention in that there is a damping element non-rotatably mounted within the housing part. The damping element is made of damping plastic and surrounds the shaft. The rotor part and/or the damping element respectively have at least one rotation-resistance producing interengaging contact part. Because of the contact part of the damping element in interaction with the rotor part, excellent damping is attached in simple fashion without the need to employ viscous material. The storage part and the damping element can, hereby, be advantageously manufactured by two-component molding process whereby, in addition, the contact part can be designed as a rib extending axially relative to the shaft.

In further embodiment of the invention, the rotor part can have a cross piece which protrudes into a circumferential recess of the damping element. The cross piece can be equipped with at least one axially extending rib. Preferably, several ribs are distributed over the interior and exterior circumference. The recess into which the cross piece is inserted can be designed, in cross section, in the form of a funnel with a narrow frontal opening zone.

For joining the housing part with the rotor part, a collar of the rotor part can have a circumferential groove at its exterior circumference. A circumferential contact ring which is molded onto the interior circumference of the housing part can interengage and embed in the circumferential groove.

For joining the rotor part with the housing, locking zones may be employed which are, for instance, arranged over the circumference of the front side of the rotor part and which can embed themselves in the corresponding recesses of the housing.

In order to arrange the entire rotation damper rotation-safe in a larger structural unit, the housing can have, at its exterior circumference, at least one stop element.

Still other advantages and benefits of the invention will become apparent to those skilled in the art upon a reading and understanding of the following detailed description.

BRIEF DESCRIPTION OF THE DRAWINGS

In the following, the invention is described in more detail on the basis of an exemplary embodiment illustrated in the drawings wherein:

FIG. 1 is a front view of the rotation damper;

FIG. 2 is a cross-sectional view taken on line II—II of FIG. 1; and,

FIGS. 3a, 3b, 3c, 4a, 4b, and 4c show a perspective view of the storage part, the rotor part, and the damping element in front and rear views, respectively.

DETAILED DESCRIPTION OF THE PREFERRED EMBODIMENTS

Referring now to the drawings wherein the showings are for the purposes of illustrating the preferred embodiment of the invention only and not for purposes of limiting same, in FIGS. 1 and 2, a rotation damper is shown which essentially comprises a plastic housing or storage part 2, a rotor part 3 arranged therein, and a damping element 4 arranged between rotor part 3 and housing part 2. The housing part 2 can be incorporated in a non-rotational manner in a larger structural unit (not shown) by means of an arresting or stop element 30 which is arranged at the exterior surface. The rotor part 3 is suitably fastened on a rotating shaft 8 for rotation therewith within housing part 2.

As is apparent from FIGS. 2, 3c, or 4c, the rotor part 3 has a cylindrically configured, axially extending cross piece 20 which has, in the specific embodiments illustrated in the FIGURES, several ribs 6, 6' distributed over its interior and exterior circumference.

The cross piece 20 of rotor part 3 projects into a recess 10 of damping element 4. It is evident from FIG. 2 that said recess 10 of the damping element 4 is funnel shaped in cross section with a frontally more narrow opening zone 11. The cross piece 20 of rotor part 3 can have a rectangular shape in cross section. Any suitable plastic having a degree of resilience and satisfactory friction characteristics can be used to form the damping element 4. The characteristics of the plastics should be selected to provide the necessary cooperative effect.

The ribs 6, 6' serve as contact piece 5, 5' which produce, during turning of shaft 8, a rotational resistance in the damping element 4, and this occurs in that the cross piece 20 engages with ribs 6, 6' in the recess 10 of damping element 4.

The housing part 2 and the damping element 4 can be produced by the known two-component molding process with the damping element being molded directly in place. The possibility also exists that the damping element 4 has, at its frontal side 15, facing away from the storage part 2, a locking zone 16 which embeds itself in the adjacent area of the storage part 2. In this configuration, the area of the storage part 2 is equipped with recesses 18 in which, for example, three locking zones distributed over the circumference of the frontal side 15 can embed themselves according to FIGS. 3b or 4a, or also according to FIG. 2. This guarantees positive fastening of damping element 4 within storage part 2.

Rotor part 3 has a circumferential collar 21 which is connectable with shaft 8 onto which is molded, at one frontal side 22, the cross piece 20. Collar 21 is connectable via its exterior circumference 23 with housing part 2. For that purpose, collar 21 has, according to FIG. 2, a circumferential groove 24 at its outer circumference 23 into which is embeddable a circumferential contact ring 25 (FIG. 4a) which is molded onto the interior circumference of storage part 2.

It is apparent from FIG. 2 that the storage part 2 encloses and covers the damping element 4 and the rotor part 3.

As a result of the contact of cross piece 20 with the ribs 6, arranged at the outer and/or inner circumference, or with 6' arranged in the recess 10 of damping element 4, excellent damping resistance of rotor part 3 is obtained vis-a-vis damping element 4, with rotation by a certain degree of shaft 8.

The entire arrangement is of simple construction whereby the use of viscous material can be eliminated. The rotation damper according to the invention is insertable, for example, with respect to the cover hatch of a glove compartment of a motor vehicle, with respect to the sealing cover for an ashtray, or a tilting hand grip, or with respect to operating hinges of hi-fi instruments or dictating machines.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. A rotation damper including a housing carrying a rotor part connected with a rotatable shaft and a damping device located between the housing and the rotor part characterized in that the damping element (4) is made of plastic damping material and is non-rotatably mounted in the housing (2) to surround the shaft (8), the rotor part including a projecting member (20) projecting axially out therefrom, and at least one of the rotor part (3) and the damping element (4) has at least one, rotation-resistance-producing contact part (5, 5') on the projecting member.

2. A rotation damper according to claim 1 characterized in that the contact part (5, 5') is designed in form of a rib (6, 6') extending axially relative to shaft (8).

3. A rotation damper according to claim 1 characterized in that the housing (2) and the damping element (4) are produced by two-component molding process.

4. A rotation damper according to claim 1 characterized in that the housing (2) covers the damping element (4) and the rotor part (3).

5. A rotation damper according to claim 1 characterized in that the housing (2) has at least one arresting element (30) at an exterior circumference.

6. A rotation damper according to claim 1 wherein the damper being configured to surround a portion of the projecting member and engage the projecting member at the rotation-resistance-producing contact part.

7. A rotation damper including a housing carrying a rotor part connected with a rotatable shaft and a damping device located between the housing and the rotor part characterized in that the damping element (4) is non-rotatably mounted in the housing (2) to surround the shaft (8), at least one of the rotor part (3) and the damping element (4) has at least one rotation-resistance-producing contact part (5, 5'), and the rotor part (3) has one cross piece (20) projecting into a circumferential recess (10) of the damping element (4), said cross piece being equipped with at least one axially extending rib (6, 6').

8. A rotation damper according to claim 7 characterized in that the cross piece (20) has several ribs (6, 6') distributed over at least one of the interior and exterior circumference.

9. A rotation damper according to claim 8 characterized by three ribs distributed over at least one of the interior and exterior circumference.

10. A rotation damper according to claim 7 characterized in that the recess (10) of the damping element (4) is designed, in cross section, in the shape of a funnel with a frontally more narrow opening zone (1).

11. A rotation damper according to claim 7 characterized in that cross piece (20) has a rectangular shape in cross section.

12. A rotation damper according to claim 7 characterized in that the rotor part (3) has a circumferential collar (21) onto which is molded, at one front side (22), the cross piece (20).

13. A rotation damper according to claim 12 characterized in that the collar (21) is connected with the housing (2) via an exterior circumference (23).

14. A rotation damper according to claim 13 characterized in that the collar has, at its exterior circumference, a circumferential groove (24) in which is embeddable a circumferential contact ring (25) molded onto the inner circumference of the housing part (2).

15. A rotation damper including a housing carrying a rotor part connected with a rotatable shaft and a damping device located between the housing and the rotor part characterized in that the damping element (4) is non-rotatably mounted in the housing (2) to surround the shaft (8), at least one of the rotor part (3) and the damping element (4) has at least one rotation-resistance-producing contact part (5, 5'), and the damping element (4) has, at the housing (2) facing a front side (15), at least one locking zone being embedded in the housing (2).

16. A rotation damper according to claim 15 characterized by three locking zones (16) distributed over the circumference of the front side (15) which are embeddable in corresponding recesses (18) of the housing (2).

* * * * *